United States Patent
Kim et al.

(10) Patent No.: US 11,718,745 B2
(45) Date of Patent: Aug. 8, 2023

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Gyu Sun Kim, Daejeon (KR); Dae Woo Lee, Daejeon (KR); Jae Bum Seo, Daejeon (KR); Jung Tae Park, Daejeon (KR); Seongjae Shin, Daejeon (KR); Jiuk Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 275 days.

(21) Appl. No.: 17/417,360

(22) PCT Filed: Sep. 24, 2020

(86) PCT No.: PCT/KR2020/012988
§ 371 (c)(1),
(2) Date: Jun. 22, 2021

(87) PCT Pub. No.: WO2021/080201
PCT Pub. Date: Apr. 29, 2021

(65) Prior Publication Data
US 2022/0073724 A1    Mar. 10, 2022

(30) Foreign Application Priority Data

Oct. 23, 2019 (KR) .................. 10-2019-0132326
Sep. 21, 2020 (KR) .................. 10-2020-0121468

(51) Int. Cl.
| | | |
|---|---|---|
| C08L 51/00 | (2006.01) |
| C08F 212/08 | (2006.01) |
| C08F 220/14 | (2006.01) |
| C08F 220/44 | (2006.01) |
| C08F 222/40 | (2006.01) |

(52) U.S. Cl.
CPC .......... *C08L 51/003* (2013.01); *C08F 212/08* (2013.01); *C08F 220/14* (2013.01); *C08F 220/44* (2013.01); *C08F 222/40* (2013.01); *C08L 2201/08* (2013.01); *C08L 2203/30* (2013.01); *C08L 2205/025* (2013.01); *C08L 2205/03* (2013.01); *C08L 2205/18* (2013.01)

(58) Field of Classification Search
CPC .... C08F 265/06; C08F 222/40; C08F 220/44; C08L 2205/03; C08L 2205/035
See application file for complete search history.

(56) References Cited

U.S. PATENT DOCUMENTS

| | | |
|---|---|---|
| 5,948,879 A | 9/1999 | Mori et al. |
| 5,955,541 A | 9/1999 | Wada et al. |
| 2016/0245970 A1 | 8/2016 | Um et al. |
| 2018/0265690 A1 | 9/2018 | Kim et al. |
| 2019/0382574 A1 | 12/2019 | An et al. |

FOREIGN PATENT DOCUMENTS

| | | |
|---|---|---|
| EP | 0204548 A2 | 12/1986 |
| JP | 1987138510 A | 6/1987 |
| JP | 1987199645 A | 9/1987 |
| JP | 1992136059 A | 5/1992 |
| JP | 1998-204237 A | 8/1998 |
| JP | 2002012735 A | 1/2002 |
| JP | 2012-251015 A | 12/2012 |
| JP | 2014084362 A | 5/2014 |
| JP | 2017039951 A | 2/2017 |
| JP | 2017132981 A | 8/2017 |
| KR | 10-2013-0075793 A | 7/2013 |
| KR | 10-1339384 B1 | 12/2013 |
| KR | 10-2014-0099609 A | 8/2014 |
| KR | 10-1478394 B1 | 12/2014 |
| KR | 10-2018-0073062 A | 7/2018 |
| KR | 10-2019-0013569 A | 2/2019 |
| KR | 10-2019-0065944 A | 6/2019 |
| KR | 10-2019-0065966 A | 6/2019 |
| KR | 10-2019-0081767 A | 7/2019 |
| KR | 10-2019-0082087 A | 7/2019 |

OTHER PUBLICATIONS

Cheil Industries, electronic translation of Kr 20140099609, Aug. 2014.*
Supplementary European Search Report for related Application No. EP 20878652.5, dated Oct. 10, 2022.

* cited by examiner

*Primary Examiner* — Jeffrey C Mullis

(57) ABSTRACT

A thermoplastic resin composition of the present invention includes 55 to 70% by weight of a non-grafted copolymer (A) containing 65 to 83% by weight of a (meth)acrylic acid alkyl ester compound, 2 to 12% by weight of an N-substituted maleimide compound, 1 to 6% by weight of a vinyl cyanide compound, and 7 to 17% by weight of an aromatic vinyl compound; 20 to 42% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm. Within this range, a thermoplastic resin composition having excellent weather resistance, heat resistance, scratch resistance, and colorability.

13 Claims, No Drawings

THERMOPLASTIC RESIN COMPOSITION, METHOD OF PREPARING THE SAME, AND MOLDED ARTICLE INCLUDING THE SAME

This application is a National Phase of International Application No. PCT/KR2020/012988 which claims priority to Korean Patent Application No. 10-2019-0132326, filed on Oct. 23, 2019, and Korean Patent Application No. 10-2020-0121468, re-filed on Sep. 21, 2020, based on the priority of the above patent, in the Korean Intellectual Property Office, the disclosures of each of which are incorporated herein by reference.

CROSS-REFERENCE TO RELATED APPLICATIONS

This application claims priority to Korean Patent Application No. 10-2019-0132326, filed on Oct. 23, 2019, and Korean Patent Application No. 10-2020-0121468, re-filed on Sep. 21, 2020, based on the priority of the above patent, in the Korean Intellectual Property Office, the disclosures of each of which are incorporated herein by reference.

TECHNICAL FIELD

The present invention relates to a thermoplastic resin composition, a method of preparing the same, and a molded article including the same. More particularly, the present invention relates to a thermoplastic resin composition having excellent weather resistance, heat resistance, scratch resistance, and colorability, a method of preparing the thermoplastic resin composition, and a molded article including the thermoplastic resin composition.

BACKGROUND ART

ABS resins, which are acrylonitrile-butadiene-styrene terpolymers, have excellent impact resistance, rigidity, chemical resistance, and processability. Thus, ABS resins have been used in various fields such as electrical and electronic products, building materials, and automobile parts. However, since ABS resins contain a butadiene rubber polymer, ABS resins have poor weather resistance. Accordingly, ABS resins are not suitable as outdoor materials.

To solve this problem and to obtain a thermoplastic resin having excellent physical properties, weather resistance, and aging resistance, an acrylonitrile-styrene-acrylate (ASA) resin prepared using a crosslinked alkyl acrylate rubber polymer without an ethylenically unsaturated polymer that causes aging when exposed to ultraviolet has been developed. These ASA resins have excellent weather resistance and aging resistance, and thus, have been used in various fields such as automobile parts, ship materials, leisure goods, construction materials, and horticultural goods.

In particular, ASA resins used for interior and exterior parts of automobiles can realize weight reduction, improvement in degree of freedom in design, and production cost reduction, and thus the market for ASA resins is growing. In addition to weather resistance, there is increasing demand for heat resistance and high degree of blackness that can realize deep black color, which is a trend in the luxury automobile market.

For this purpose, ASA resins are subjected to painting, plating or the like. However, in consideration of environmental protection, there is demand for a product that can be implemented without painting. However, compared to painted products, unpainted products have poor appearance properties such as scratch resistance and color, which may reduce the product value thereof.

In addition, when an ASA resin and an α-methylstyrene heat resistant copolymer are kneaded to impart heat resistance to the ASA resin, heat resistance is improved, but coloration is poor due to the high refractive index of the α-methylstyrene copolymer, making it difficult to achieve satisfactory blackness.

Therefore, in addition to excellent heat resistance and scratch resistance, an ASA resin having excellent colorability and thus capable of implementing high degree of blackness needs to be developed.

RELATED ART DOCUMENTS

[Patent Documents] (Patent Document 1) KR 1478394 B1

DISCLOSURE

Technical Problem

Therefore, the present invention has been made in view of the above problems, and it is one object of the present invention to provide a thermoplastic resin composition having excellent weather resistance, heat resistance, scratch resistance, and colorability.

It is another object of the present invention to provide a method of preparing the thermoplastic resin composition.

It is yet another object of the present invention to provide a molded article manufactured using the thermoplastic resin composition.

The above and other objects can be accomplished by the present disclosure described below.

Technical Solution

In accordance with one aspect of the present invention, provided is a thermoplastic resin composition including 55 to 70% by weight of a non-grafted copolymer (A) containing 65 to 83% by weight of a (meth)acrylic acid alkyl ester compound, 2 to 12% by weight of an N-substituted maleimide compound, 1 to 6% by weight of a vinyl cyanide compound, and 7 to 17% by weight of an aromatic vinyl compound; 20 to 42% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm.

In accordance with another aspect of the present invention, provided is a method of preparing a thermoplastic resin composition, the method including kneading and extruding, under conditions of 200 to 270° C. and 200 to 300 rpm, 55 to 70% by weight of a non-grafted copolymer (A) containing 65 to 83% by weight of a (meth)acrylic acid alkyl ester compound, 2 to 12% by weight of an N-substituted maleimide compound, 1 to 6% by weight of a vinyl cyanide compound, and 7 to 17% by weight of an aromatic vinyl compound; 20 to 42% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm.

In accordance with yet another aspect of the present invention, provided is a molded article manufactured using the thermoplastic resin composition.

Advantageous Effects

According to the present invention, a thermoplastic resin composition having excellent weather resistance, heat resistance, scratch resistance, and colorability, a method of preparing the thermoplastic resin composition, and a molded article including the thermoplastic resin composition can be provided. In addition, by including an aromatic vinyl compound in a non-grafted copolymer included in the thermoplastic resin composition, the conversion rate of an N-substituted maleimide compound is improved. Thus, after polymerization, the residual amount of the N-substituted maleimide compound in a recovery solution is reduced.

Accordingly, in a volatilization process, precipitation of the N-substituted maleimide compound in a pipe connected to a residual monomer recovery tank can be reduced, thereby increasing productivity.

BEST MODE

Hereinafter, a thermoplastic resin composition, a method of preparing the same, and a molded article including the same according to the present invention will be described in detail.

The present inventors confirmed that, when two types of ASA resins each containing rubber particles having different particle diameters and a non-grafted copolymer including a (meth)acrylic acid alkyl ester compound, a vinyl cyanide compound, an aromatic vinyl compound, and an N-substituted maleimide compound were mixed within a specific range, weather resistance, heat resistance, scratch resistance, and colorability were improved. Based on these results, the present inventors conducted further studies to complete the present invention.

The thermoplastic resin composition of the present invention includes 55 to 70% by weight of a non-grafted copolymer (A) containing 65 to 83% by weight of a (meth)acrylic acid alkyl ester compound, 2 to 12% by weight of an N-substituted maleimide compound, 1 to 6% by weight of a vinyl cyanide compound, and 7 to 17% by weight of an aromatic vinyl compound; 20 to 42% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm. In this case, weather resistance and heat resistance may be excellent, and in particular, scratch resistance and colorability may be improved.

Hereinafter, each component of the thermoplastic resin composition of the present invention will be described in detail.

(A) Non-Grafted Copolymer

For example, based on the total weight of the thermoplastic resin composition, the non-grafted copolymer (A) may be included in an amount of 55 to 70% by weight, preferably 60 to 70% by weight, more preferably 63 to 67% by weight. Within this range, weather resistance and heat resistance may be excellent, and in particular, scratch resistance and colorability may be improved.

For example, the non-grafted copolymer (A) may include 65 to 83% by weight of a (meth)acrylic acid alkyl ester compound, 2 to 12% by weight of an N-substituted maleimide compound, 1 to 6% by weight of a vinyl cyanide compound, and 7 to 17% by weight of an aromatic vinyl compound. Within this range, scratch resistance and colorability may be excellent, and the polymerization rate of the N-substituted maleimide compound may be increased. Thus, during long-term operation, the amount of the N-substituted maleimide compound remaining in a recovery solution may be reduced. Accordingly, precipitation of the N-substituted maleimide compound in a pipe connected to a residual monomer recovery tank may be reduced in a volatilization process (devolatilization), thereby increasing productivity.

For example, based on the total weight of the non-grafted copolymer (A), the (meth)acrylic acid alkyl ester compound included in the non-grafted copolymer (A) may be included in an amount of 65 to 83% by weight, preferably 70 to 80% by weight, more preferably 73 to 80% by weight, still more preferably 73 to 75% by weight. Within this range, weather resistance and heat resistance may be excellent, and in particular, scratch resistance and colorability may be improved.

For example, the N-substituted maleimide compound included in the non-grafted copolymer (A) may be included in an amount of 2 to 12% by weight, preferably 4 to 10% by weight, more preferably 6 to 10% by weight. Within this range, weather resistance and heat resistance may be excellent, and in particular, scratch resistance and colorability may be improved.

For example, based on the total weight of the non-grafted copolymer (A), the vinyl cyanide compound included in the non-grafted copolymer (A) may be included in an amount of 1 to 6% by weight, preferably 2 to 5% by weight, more preferably 3 to 5% by weight. Within this range, weather resistance and heat resistance may be excellent, and in particular, scratch resistance and colorability may be improved.

For example, based on the total weight of the non-grafted copolymer (A), the aromatic vinyl compound included in the non-grafted copolymer (A) may be included in an amount of 7 to 17% by weight, preferably 10 to 15% by weight, more preferably 12 to 15% by weight. Within this range, weather resistance and heat resistance may be excellent, and in particular, scratch resistance and colorability may be improved.

For example, the (meth)acrylic acid alkyl ester compound included in the non-grafted copolymer (A) may include one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester, preferably methyl methacrylate. In this case, proper fluidity may be ensured, and weather resistance and heat resistance may be excellent.

For example, the N-substituted maleimide compound included in the non-grafted copolymer (A) may include one or more selected from the group consisting of N-phenyl maleimide, N-methyl maleimide, N-ethyl maleimide, N-butyl maleimide, and N-cyclohexyl maleimide, preferably N-phenyl maleimide. In this case, heat resistance and scratch resistance may be excellent.

For example, the vinyl cyanide compound included in the non-grafted copolymer (A) may be acrylonitrile, methacrylonitrile, or a mixture thereof. In this case, impact resistance and processability may be excellent.

For example, the aromatic vinyl compound included in the non-grafted copolymer (A) may include one or more selected from the group consisting of styrene, vinyl toluene, t-butylstyrene, and chlorostyrene, preferably styrene. In this case, processability may be excellent due to proper fluidity, and mechanical properties such as impact resistance may be excellent.

For example, the aromatic vinyl compound included in the non-grafted copolymer (A) excludes α-methylstyrene.

For example, the non-grafted copolymer (A) may have a weight average molecular weight of 95,000 to 130,000 g/mol, preferably 96,000 to 120,000 g/mol, more preferably 99,000 to 115,000 g/mol. Within this range, mechanical properties such as impact strength may be excellent, and fluidity suitable for processing may be secured.

For example, the non-grafted copolymer (A) may have a polydispersity index (PDI) of 1.80 to 2.2, preferably 1.83 to 2.1, more preferably 1.90 to 2.10. Within this range, reduction in fluidity due to increase in molecular weight may be prevented, and physical properties and processability may be improved.

In the present invention, a polydispersity index (PDI) value is obtained by dividing weight average molecular weight by number average molecular weight. Molecular weight distribution becomes more uniform as the polydispersity index (PDI) value decreases.

In this description, unless otherwise defined, weight average molecular weight and number average molecular weight may be measured using 1 g of a copolymer dissolved in tetrahydrofuran (THF) at 40° C. using a gel chromatograph (GPC) filled with porous silica. In this case, calibration may be performed using polystyrene (PS) as a standard material, and then molecular weight may be measured.

For example, the non-grafted copolymer (A) may have a glass transition temperature of 107° C. or more, preferably 107 to 130° C., more preferably 110 to 125° C. Within this range, heat resistance, scratch resistance, and colorability may be excellent.

In the present invention, glass transition temperature may be measured using a differential scanning calorimeter (DSC).

For example, the non-grafted copolymer (A) may have a refractive index of 1.520 or less, preferably 1.510 to 1.520, more preferably 1.513 to 1.519. Within this range, colorability may be excellent.

In the present invention, refractive index may be measured at 25° C. using an Abbe refractometer according to ASTM D542.

(B) Acrylate-Based Rubber-Aromatic Vinyl Compound-Vinyl Cyanide Compound Graft Copolymer Containing Acrylate-Based Rubber Having an Average Particle Diameter of 50 to 200 nm Based on the total weight of the thermoplastic resin composition, the acrylate-based rubber-aromatic vinyl compound-vinyl cyanide compound graft copolymer (B) containing acrylate-based rubber having an average particle diameter of 50 to 200 nm (hereinafter referred to as "small-diameter graft copolymer") may be included in an amount of 20 to 42% by weight, preferably 25 to 37% by weight, more preferably 28 to 33% by weight. Within this range, mechanical properties, such as impact strength and tensile strength, heat resistance, weather resistance, scratch resistance, and colorability may be excellent. When the content of the graft copolymer (B) is less than the above range, impact resistance may be reduced. When the content of the graft copolymer (B) exceeds the above range, fluidity and scratch resistance may be reduced.

For example, the small-diameter graft copolymer (B) may be an acrylate-based rubber-aromatic vinyl compound-vinyl cyanide compound graft copolymer containing acrylate-based rubber having an average particle diameter of 50 to 200 nm. In this case, mechanical properties, such as impact strength and tensile strength, heat resistance, colorability, and weather resistance may be excellent.

For example, the acrylate-based rubber contained in the small-diameter graft copolymer (B) may have an average particle diameter of 50 to 200 nm, preferably 70 to 150 nm, more preferably 100 to 130 nm. Within this range, mechanical properties, heat resistance, and weather resistance may be excellent. When the acrylate-based rubber has an average particle diameter less than the above range, mechanical properties such as impact strength and tensile strength may be degraded. When the acrylate-based rubber has an average particle diameter exceeding the above range, thermal stability may be degraded.

For example, based on the total weight of the small-diameter graft copolymer (B), the acrylate-based rubber contained in the small-diameter graft copolymer (B) may be included in an amount of 20 to 60% by weight, 30 to 55% by weight, preferably 40 to 50% by weight. Within this range, weather resistance, impact strength, and scratch resistance may be excellent.

In the present invention, average particle diameter may be measured using a Gaussian intensity distribution (Nicomp 380) through dynamic laser light scattering.

For example, the acrylate-based rubber may be prepared by emulsion polymerization of an acrylate-based monomer. As a specific example, the acrylate-based rubber may be prepared by emulsion polymerization of a mixture containing an acrylate-based monomer, an emulsifier, an initiator, a grafting agent, a crosslinking agent, an electrolyte, and water. In this case, grafting efficiency may be excellent, and thus physical properties such as impact resistance may be excellent.

For example, the acrylate-based monomer may include one or more selected from the group consisting of alkyl acrylates having 2 to 8 carbon atoms, preferably alkyl acrylates containing an alkyl group having 4 to 8 carbon atoms, more preferably butyl acrylate or ethylhexyl acrylate.

For example, the emulsifier may be a fatty acid metal salt having 12 to 20 carbon atoms, a rosin acid metal salt having 12 to 20 carbon atoms, or a mixture thereof. For example, the fatty acid metal salt having 12 to 20 carbon atoms may include one or more selected from sodium fatty acid, sodium laurate, sodium oleate, and potassium oleate. For example, the rosin acid metal salt having 12 to 20 carbon atoms may be sodium rosinate, potassium rosinate, or a mixture thereof. In this case, impact resistance and weather resistance may be improved.

For example, based on 100 parts by weight of the acrylate-based monomer, the emulsifier may be included in an amount of 1 to 4 parts by weight, preferably 1.5 to 3 parts by weight. Within this range, components of the acrylate-based rubber may be easily mixed, and thus impact resistance and weather resistance may be improved.

For example, the initiator may be an inorganic peroxide, an organic peroxide, or a mixture thereof. As a specific example, the initiator may include one or more selected from the group consisting of a water-soluble initiator such as potassium persulfate, sodium persulfate, or ammonium persulfate and a fat-soluble initiator such as cumene hydroperoxide or benzoylperoxide. In this case, polymerization may be facilitated, and thus impact resistance and weather resistance may be improved.

For example, based on 100 parts by weight of the acrylate-based monomer, the initiator may be included in an amount of 0.05 to 1 part by weight, preferably 0.1 to 0.5 parts by weight. Within this range, polymerization may be facilitated, and thus impact resistance and weather resistance may be improved.

For example, the crosslinking agent may include one or more selected from the group consisting of ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, and trimethylol methane triacrylate. In this case, the elasticity of acrylate-based rubber may be further increased, and mechanical properties such as impact strength and tensile strength may be improved.

For example, based on 100 parts by weight of the acrylate-based monomer, the crosslinking agent may be included in an amount of 0.02 to 0.3 parts by weight, preferably 0.05 to 0.2 parts by weight. Within this range, the elasticity of acrylate-based rubber may be further increased, and mechanical properties such as impact strength and tensile strength may be improved.

For example, the electrolyte may include one or more selected from the group consisting of sodium hydrogen carbonate ($NaHCO_3$), disodium disulfide ($Na_2S_2O_7$), and potassium carbonate ($K_2CO_3$).

For example, based on 100 parts by weight of the acrylate-based monomer, the electrolyte may be included in an amount of 0.01 to 0.5 parts by weight.

For example, the acrylate-based rubber may further include a molecular weight modifier. The molecular weight modifier may be, for example, t-dodecyl mercaptan, n-octyl mercaptan, or a mixture thereof. In this case, the weight average molecular weight of the acrylate-based rubber may be adjusted so that the impact resistance and weather resistance of a composition are improved.

For example, based on 100 parts by weight of the acrylate-based monomer, the molecular weight modifier may be included in an amount of 0.01 to 1 part by weight, preferably 0.01 to 0.3 parts by weight. Within this range, impact resistance and weather resistance may be improved.

For example, based on the total weight of the small-diameter graft copolymer (B), the aromatic vinyl compound included in the small-diameter graft copolymer (B) may be included in an amount of 10 to 50% by weight, preferably 20 to 45% by weight, more preferably 30 to 40% by weight. Within this range, mechanical properties, such as tensile strength and impact strength, and processability may be excellent.

For example, the aromatic vinyl compound included in the small-diameter graft copolymer (B) may include one or more selected from the group consisting of styrene, α-methyl styrene, o-methyl styrene, p-methyl styrene, m-methyl styrene, ethyl styrene, isobutyl styrene, t-butyl styrene, o-bromo styrene, p-bromo styrene, m-bromo styrene, o-chloro styrene, p-chloro styrene, m-chloro styrene, vinyl toluene, vinyl xylene, fluorostyrene, and vinylnaphthalene. In this case, processability may be excellent due to proper fluidity, and mechanical properties such as tensile strength and impact strength may also be excellent.

For example, based on the total weight of the small-diameter graft copolymer (B), the vinyl cyanide compound included in the small-diameter graft copolymer (B) may be included in an amount of 5 to 30% by weight, preferably 5 to 25% by weight, more preferably 10 to 20% by weight. Within this range, impact resistance and processability may be excellent.

For example, the vinyl cyanide compound included in the small-diameter graft copolymer (B) may be acrylonitrile, methacrylonitrile, or a mixture thereof. In this case, impact resistance and processability may be excellent.

(C) Acrylate-Based Rubber-Aromatic Vinyl Compound-Vinyl Cyanide Compound Graft Copolymer Containing Acrylate-Based Rubber Having an Average Particle Diameter of 300 to 600 nm For example, based on the total weight of the thermoplastic resin composition, the acrylate-based rubber-aromatic vinyl compound-vinyl cyanide compound graft copolymer (C) containing acrylate-based rubber having an average particle diameter of 300 to 600 nm (hereinafter referred to as "large-diameter graft copolymer") may be included in an amount of 1 to 15% by weight, preferably 1 to 10% by weight, more preferably 2 to 7% by weight. Within this range, mechanical properties, such as impact strength and tensile strength, heat resistance, weather resistance, scratch resistance, and colorability may be excellent. When the graft copolymer (C) is included in an amount less than the above range, impact resistance may be reduced. When the graft copolymer (C) is included in an amount exceeding the above range, grafting degree may be reduced, thereby reducing hardness and scratch resistance.

For example, the large-diameter graft copolymer (C) may be an acrylate-based rubber-aromatic vinyl compound-vinyl cyanide compound graft copolymer containing acrylate-based rubber having an average particle diameter of 300 to 600 nm. In this case, mechanical properties, such as impact strength and tensile strength, heat resistance, colorability, and weather resistance may be excellent.

For example, the large-diameter graft copolymer (C) may include 20 to 60% by weight of acrylate-based rubber having an average particle diameter of 300 to 600 nm, 10 to 50% by weight of an aromatic vinyl compound, and 5 to 30% by weight of a vinyl cyanide compound. Within this range, mechanical properties, heat resistance, and weather resistance may be improved.

For example, the acrylate-based rubber included in the large-diameter graft copolymer (C) may have an average particle diameter of 300 to 600 nm, preferably 300 to 500 nm, more preferably 350 to 450 nm. Within this range, mechanical properties such as impact strength and tensile strength may be excellent. When the average particle diameter of the acrylate-based rubber is less than the above range, impact resistance may be reduced. When the average particle diameter of the acrylate-based rubber exceeds the above range, fluidity, processability, and gloss may be reduced.

For example, based on the total weight of the large-diameter graft copolymer (C), the acrylate-based rubber included in the large-diameter graft copolymer (C) may be included in an amount of 20 to 60% by weight, preferably 30 to 55% by weight, more preferably 40 to 50% by weight. Within this range, impact resistance and scratch resistance may be improved.

For example, the acrylate-based rubber may be prepared by emulsion polymerization of an acrylate-based monomer. As a specific example, the acrylate-based rubber may be prepared by emulsion polymerization of a mixture containing an acrylate-based monomer, an emulsifier, an initiator, a grafting agent, a crosslinking agent, an electrolyte, and a solvent. In this case, grafting efficiency may be excellent, and thus physical properties such as impact resistance may be excellent.

Components such as an acrylate-based monomer, an emulsifier, an initiator, a grafting agent, a crosslinking agent, an electrolyte, and water used to prepare the acrylate-based rubber included in the large-diameter graft copolymer (C) may be the same components as used to prepare the acrylate-based rubber included in the small-diameter graft copolymer (B). In addition, the content of each component of the acrylate-based rubber included in the large-diameter graft copolymer (C) may be selected within the same content range as the acrylate-based rubber included in the small-diameter graft copolymer (B).

For example, based on the total weight of the large-diameter graft copolymer (C), the aromatic vinyl compound included in the large-diameter graft copolymer (C) may be included in an amount of 10 to 50% by weight, preferably 20 to 45% by weight, more preferably 30 to 40% by weight. Within this range, impact resistance, weather resistance, and chemical resistance may be excellent.

For example, based on the total weight of the large-diameter graft copolymer (C), the vinyl cyanide compound included in the large-diameter graft copolymer (C) may be included in an amount of 5 to 30% by weight, preferably 5 to 25% by weight, more preferably 10 to 20% by weight. Within this range, mechanical strength and discoloration resistance may be excellent.

The vinyl cyanide compound and the aromatic vinyl compound included in the large-diameter graft copolymer (C) may be the same as those included in the small-diameter graft copolymer (B).

In the present invention, the total weight of a copolymer may mean the actual total weight of the copolymer or the total weight of monomers added instead of the copolymer.

Thermoplastic Resin Composition

For example, the thermoplastic resin composition may include one or more selected from the group consisting of a lubricant, an antioxidant, a UV stabilizer, a release agent, a pigment, and a dye. In this case, weather resistance, heat resistance, and scratch resistance may be excellent without deterioration in mechanical properties.

For example, the lubricant may include one or more selected from the group consisting of ethylene bis stearamide, oxidized polyethylene wax, and magnesium stearate, preferably ethylene bis stearamide. In this case, the wettability of the composition of the present invention may be improved, and mechanical properties may be excellent.

For example, based on 100 parts by weight in total of the non-grafted copolymer (A), the small-diameter graft copolymer (B), and the large-diameter graft copolymer (C), the lubricant may be included in an amount of 0.1 to 3 parts by weight, preferably 0.1 to 2 parts by weight, more preferably 0.05 to 1.5 parts by weight. Within this range, the wettability of the composition of the present invention may be improved, and mechanical properties may be excellent.

For example, the antioxidant may include phenolic antioxidants, phosphorus antioxidants, or mixtures thereof. In this case, oxidation by heat may be prevented during extrusion, and mechanical properties may be excellent.

For example, based on 100 parts by weight in total of the non-grafted copolymer (A), the small-diameter graft copolymer (B), and the large-diameter graft copolymer (C), the antioxidant may be included in an amount of 0.01 to 3 parts by weight, preferably 0.01 to 1 part by weight, more preferably 0.1 to 1 part by weight. Within this range, oxidation by heat may be prevented during extrusion, and mechanical properties may be excellent.

For example, based on 100 parts by weight in total of the non-grafted copolymer (A), the small-diameter graft copolymer (B), and the large-diameter graft copolymer (C), the dye may be included in an amount of 0.1 to 1.5 parts by weight, preferably 0.5 to 1 part by weight. Within this range, the intrinsic physical properties of the thermoplastic resin composition of the present invention may not be degraded, and color expression may be excellent.

For example, the thermoplastic resin composition may have an L value (colorability) of 25.5 or less, preferably 20 to 25.5, more preferably 24 to 25 as measured using a Hunter Lab spectrophotometer. Within this range, physical property balance may be excellent.

For example, the thermoplastic resin composition may have a pencil hardness of 2H or more, preferably 2H to 4H as measured at an angle of 45° under a load of 0.5 kg using a pencil hardness tester (Cometech) according to ASTM D3363. Within this range, physical property balance may be excellent.

For example, the thermoplastic resin composition may have a heat deflection temperature of 90° C. or more, preferably 90 to 105° C., more preferably 90 to 100° C. as measured according to ASTM D648. Within this range, physical property balance may be excellent.

For example, the thermoplastic resin composition may have an Izod impact strength (¼", 23° C.) of 5.5 kgf·cm/cm or more, preferably 5.5 to 10 kgf·cm/cm, more preferably 5.8 to 6.5 kgf·cm/cm as measured according to ASTM D256. Within this range, physical property balance may be excellent.

For example, the thermoplastic resin composition may have a tensile strength of 500 kg/cm$^2$ or more, preferably 500 to 550 kg/cm$^2$, more preferably 503 to 530 kg/cm$^2$ as measured according to ASTM D638. Within this range, physical property balance may be excellent.

For example, the thermoplastic resin composition may have a fall impact strength of 29 N or more, preferably 29 to 35 N, more preferably 29.3 to 31 N as measured using a 3.2 mm thick specimen according to ASTM D3763. Within this range, physical property balance may be excellent.

Method of Preparing Thermoplastic Resin Composition

For example, the method of preparing a thermoplastic resin composition of the present invention may include a step of kneading and extruding, under conditions of 200 to 270° C. and 200 to 300 rpm, 55 to 70% by weight of a non-grafted copolymer (A) containing 65 to 85% by weight of a (meth)acrylic acid alkyl ester compound, 1 to 10% by weight of a vinyl cyanide compound, 7 to 17% by weight of an aromatic vinyl compound, and 2 to 12% by weight of an N-substituted maleimide compound; 20 to 42% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm. In this case, weather resistance, heat resistance, scratch resistance, and colorability may be excellent.

For example, the method of preparing a thermoplastic resin composition may include a step of preparing the non-grafted copolymer (A) by polymerizing a polymerization solution prepared by mixing 100 parts by weight of a monomer mixture including 65 to 85% by weight of a (meth)acrylic acid alkyl ester compound, 1 to 10% by weight of a vinyl cyanide compound, 7 to 17% by weight of an aromatic vinyl compound, and 2 to 12% by weight of an N-substituted maleimide compound; 25 to 40 parts by weight of a reaction solvent; and 0.01 to 1 part by weight of an initiator.

For example, in the step of preparing the non-grafted copolymer (A), the reaction solvent may include one or more selected from the group consisting of ethylbenzene, toluene, methyl ethyl ketone, and xylene. In this case, viscosity may be easily adjusted, and reduction in polymerization conversion rate may be prevented.

For example, based on 100 parts by weight of the monomer mixture, the reaction solvent may be included in an amount of 25 to 40 parts by weight, preferably 30 to 40 parts by weight. Within this range, excessive increase in viscosity and reduction in conversion rate and molecular weight may be prevented.

For example, in the step of preparing the non-grafted copolymer (A), the initiator may include one or more selected from the group consisting of t-butyl peroxy-2-ethylhexanoate, benzoyl peroxide, t-butyl peroxyisobutyrate, 1,1-bis(t-butylperoxy)cyclohexane, 2,2-bis(4,4-di-t-butylperoxycyclohexane) propane, t-hexyl peroxy isopropyl monocarbonate, t-butyl peroxylaurate, t-butyl peroxy isopropyl monocarbonate, t-butyl peroxy 2-ethylhexyl monocarbonate, t-hexyl peroxybenzoate, t-butyl peroxyacetate, 2,2-bis(t-butylperoxy)butane, t-butyl peroxybenzoate, dicumyl peroxide, 2,5-dimethyl-2,5-bis(t-butyl peroxy) hexane, t-butyl cumyl peroxide, di-t-butyl peroxide, and di-t-amyl peroxide, preferably t-butyl peroxy-2-ethylhexanoate. In this case, polymerization may be facilitated, and thus impact resistance and weather resistance may be improved.

For example, based on 100 parts by weight of the monomer mixture, the initiator may be included in an amount of 0.01 to 1 part by weight, 0.01 to 0.5 parts by weight, preferably 0.01 to 0.4 parts by weight. Within this range, polymerization may be easily performed, and thus mechanical properties, weather resistance, heat resistance, and scratch resistance may be improved.

For example, in the step of preparing the non-grafted copolymer (A), polymerization may be performed at a temperature of 130 to 160° C., preferably 140 to 150° C., while continuously feeding the polymerization solution at a rate of 7 to 20 kg/hr, preferably 10 to 15 kg/hr, into a continuous reactor. In this case, compared to batch feed, the particle stability of a copolymer may be improved, and thus the particles may have a uniform internal structure, thereby improving mechanical properties, weather resistance, heat resistance, scratch resistance, and colorability.

In the present invention, "continuous polymerization" refers to a process in which materials participating in polymerization are continuously fed into a reactor, a product generated by polymerization is continuously discharged, and unreacted monomers are recovered by volatilization and used again.

For example, in the step of preparing the non-grafted copolymer (A), after polymerization, the content of the N-substituted maleimide compound remaining in a recovery solution may be 0.12% by weight or less, preferably 0.05 to 0.12% by weight, more preferably 0.07 to 0.10% by weight. Within this range, the conversion rate of the N-substituted maleimide compound may be improved. Thus, during long-term operation, precipitation of the N-substituted maleimide compound in a pipe connected to a residual monomer recovery tank may be reduced in a volatilization process, thereby increasing productivity.

In the present invention, the content of residual N-substituted maleimide compound may be measured using a gas chromatograph.

For example, kneading and extruding may be performed using a single-screw extruder, a twin-screw extruder, or a Banbury mixer. In this case, a composition may be evenly dispersed, thereby increasing compatibility.

For example, kneading and extruding may be performed at a barrel temperature of 200 to 300° C., preferably 200 to 250° C. In this case, throughput per unit time may be appropriate, melt kneading may be sufficiently performed, and thermal decomposition of resin components may be prevented.

For example, kneading and extruding may be performed at a screw speed of 200 to 300 rpm, preferably 250 to 300 rpm. In this case, throughput per unit time may be appropriate, and thus process efficiency may be excellent and excessive cutting may be prevented.

For example, the molded article of the present invention may be manufactured using the thermoplastic resin composition of the present invention. In this case, weather resistance and heat resistance may be excellent, and scratch resistance and colorability may be improved.

For example, the molded article may include one or more selected from the group consisting of automobile parts, electric/electronic parts, ship parts, and construction materials, preferably interior/exterior materials for automobiles.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.

Small-diameter graft copolymer (B): A graft copolymer (SA130, LG Chemical Co.) containing rubber particles having average particle diameter of 120 nm was used as the small-diameter graft copolymer (B)

Large-diameter graft copolymer (C): A graft copolymer (SA927, LG Chemical Co.) containing rubber particles having an average particle diameter of 400 nm was used as the large-diameter graft copolymer (C)

Lubricant: ethylene bis stearamide (EBA)

Antioxidant: SONGNOX 1076 (Songwon Co.)

Dye: Papilion Back S-KL2 (Yedahm Chemical Co.)

Example 1

<Preparation of Non-Grafted Copolymer (A)>

Polymerization was performed at 145° C. while continuously feeding, at a rate of 12 kg/hr for 14 hours, a polymerization solution containing 25 parts by weight of toluene, 75 parts by weight of methyl methacrylate (hereinafter referred to as "MMA"), 7 parts by weight of N-phenylmaleimide (hereinafter referred to as "PMI"), 3 parts by weight of acrylonitrile (hereinafter referred to as "AN"), 15 parts by weight of styrene (hereinafter referred to as "SM"), and 0.03 parts by weight of dicumyl peroxide as an initiator into a continuous reactor, and then the reaction product was introduced into a volatilization tank at 250° C. to remove unreacted monomers and a reaction solvent. After reaction, the non-grafted copolymer (A) in a pellet form was prepared. The prepared copolymer had a refractive index of 1.5183, a glass transition temperature of 115.5° C., a weight average molecular weight of 103,315 g/mol, and a PDI of 2.09. A residual PMI in a recovery solution was 0.09% by weight.

<Preparation of Thermoplastic Resin Composition>

1 part by weight of a lubricant, 0.5 parts by weight of an antioxidant, and 0.6 parts by weight of a dye were added to a composition including 65 parts by weight of the non-grafted copolymer (A), 30 parts by weight of the small-diameter graft copolymer (B), and 5 parts by weight of the large-diameter graft copolymer (C), and the mixture was fed into an extruder (28 Ψ) at 230° C. to prepare a pelletized resin. Then, the pelletized resin was injected to prepare a specimen.

Examples 2 to 5

The non-grafted copolymer (A) was prepared in the same manner as in Example 1, except that the components and the contents shown in Table 1 below were used.

Comparative Examples 1 to 10

The non-grafted copolymer (A) was prepared in the same manner as in Example 1, except that the components and the contents shown in Tables 2 to 3 below were used.

TEST EXAMPLES

The properties of specimens prepared in Examples 1 to 5 and Comparative Examples 1 to 10 were measured according to the following methods, and the results are shown in Tables 1 to 3 below.

Measurement methods

Refractive index: Refractive index was measured at 25° C. using an Abbe refractometer according to ASTM D542.

Glass transition temperature (° C.): Glass transition temperature was measured using a differential scanning calorimeter (manufacturer: Ta Instruments, product name: DSC Q20).

Weight average molecular weight (g/mol) and number average molecular weight (g/mol): Weight average molecular weight and number average molecular weight were measured at 40° C. using tetrahydrofuran (THF) as an eluate using a gel chromatograph (GPC) filled with porous silica as a column packing material. In this case, the molecular weights were obtained as relative values to a standard polystyrene (PS) specimen.

PDI: PDI was calculated by dividing weight average molecular weight by number average molecular weight.

Content of residual PMI in a recovery solution (% by weight): The content of residual PMI in a recovery solution was measured using a gas chromatograph.

Colorability (blackness; color L): A color L value was measured using a color meter (model name: Color Eye 7000A) according to a CIE 1976 L*a*b* color system. In this case, L=100 means pure white, and L=0 means pure black. Blackness becomes better as the L value decreases.

Heat deflection temperature (° C.): Heat deflection temperature was measured using a 6.4 mm thick specimen under a load of 18.6 kgf/cm$^2$ according to ASTM D648.

Pencil hardness: Pencil hardness was measured using a pencil hardness tester (Cometech) according to ASTM D3363. Specifically, a pencil was fixed at an angle of 45°, and the surface of a specimen was scratched with the pencil under a load of 0.5 kg. At this time, pencils of various hardnesses (2B, B, HB, F, H) were used. The tests were conducted in the order of 2B, B, HB, F, and H. After scratching, whether the surface was scratched was confirmed by visual observation.

Izod impact strength (kgf·cm/cm): Izod impact strength was measured using a ¼" thick specimen according to ASTM D256.

Tensile strength (kg/cm$^2$): Tensile strength was measured according to ASTM D638.

Fall impact strength (N): Fall impact strength was measured using a 3.2 mm thick specimen according to ASTM D3763.

TABLE 1

| Classification | | Example 1 | Example 2 | Example 3 | Example 4 | Example 5 |
|---|---|---|---|---|---|---|
| Composition of non-graft copolymer (A) | MMA | 75 | 76 | 75 | 73 | 80 |
| | PMI | 7 | 4 | 10 | 7 | 4 |
| | AN | 3 | 5 | 5 | 5 | 3 |
| | SM | 15 | 15 | 10 | 15 | 13 |
| Physical properties of non-graft copolymer (A) | Refractive index | 1.5183 | 1.5153 | 1.5176 | 1.5185 | 1.5131 |
| | Tg | 115.5 | 110.8 | 120.4 | 116.7 | 112.2 |
| | Mw | 103,315 | 113,991 | 99,875 | 104,247 | 96,279 |
| | PDI | 2.09 | 1.96 | 2.00 | 2.06 | 1.83 |
| | Content of residual PMI in recovery solution | 0.09 | 0.07 | 0.10 | 0.09 | 0.08 |

TABLE 1-continued

| Classification | | Example 1 | Example 2 | Example 3 | Example 4 | Example 5 |
|---|---|---|---|---|---|---|
| Composition of thermoplastic resin composition | Non-graft copolymer (A) | 65 | 65 | 65 | 65 | 65 |
| | Small-diameter graft copolymer (B) | 30 | 30 | 30 | 30 | 30 |
| | Large-diameter graft copolymer (C) | 5 | 5 | 5 | 5 | 5 |
| Physical properties of thermoplastic resin composition | Colorability | 25.0 | 24.8 | 24.9 | 25.0 | 24.7 |
| | Heat deflection temperature | 93 | 90 | 97 | 94.2 | 90.9 |
| | Pencil hardness | 2H | 2H | 2H | 2H | 2H |
| | Impact strength | 6.0 | 6.4 | 5.9 | 6.1 | 5.8 |
| | Tensile strength | 519 | 528 | 503 | 520 | 507 |
| | Falling ball impact | 30.1 | 30.5 | 29.3 | 30.2 | 29.3 |

TABLE 2

| Classification | | Comparative Example 1 | Comparative Example 2 | Comparative Example 3 | Comparative Example 4 | Comparative Example 5 |
|---|---|---|---|---|---|---|
| Composition of non-graft copolymer (A) | MMA | 50.7 | 60 | 60 | 86 | 86 |
| | PMI | 0 | 0 | 10 | 4 | 4 |
| | AN | 15.5 | 7 | 30 | 5 | 0 |
| | SM | 0 | 33 | 0 | 5 | 10 |
| | α-methylstyrene | 33.8 | 0 | 0 | 0 | 0 |
| Physical properties of non-graft copolymer (A) | Refractive index | 1.5293 | 1.5295 | 1.5060 | 1.5053 | 1.5103 |
| | Tg | 120.0 | 102.3 | 105.6 | 113.2 | 119.6 |
| | Mw | 88,410 | 79,768 | 90,628 | 84,657 | 75,580 |
| | PDI | 2.01 | 1.98 | 2.22 | 2.09 | 1.92 |
| | Content of residual PMI in recovery solution (% by weight) | 0 | 0 | 1.67 | 0.42 | 0.25 |
| Composition of thermoplastic resin composition | Non-grafted copolymer (A) | 65 | 65 | 65 | 65 | 65 |
| | Small-diameter graft copolymer (B) | 30 | 30 | 30 | 30 | 30 |
| | Large-diameter graft copolymer (C) | 5 | 5 | 5 | 5 | 5 |
| Physical properties of thermoplastic | colorability | 26.0 | 26.0 | 23.7 | 23.6 | 24.5 |
| | Heat deflection temperature | 96 | 84 | 85 | 88 | 95 |

TABLE 2-continued

| Classification | | Comparative Example 1 | Comparative Example 2 | Comparative Example 3 | Comparative Example 4 | Comparative Example 5 |
|---|---|---|---|---|---|---|
| resin composition | Pencil hardness | H | 2H | 2H | 2H | 2H |
| | Impact strength | 5.7 | 5.2 | 5.8 | 5.3 | 4.9 |
| | Tensile strength | 509 | 461 | 480 | 478 | 455 |
| | Falling ball impact | 28.9 | 26.4 | 29.1 | 28.3 | 26.1 |

TABLE 3

| Classification | | Comparative Example 6 | Comparative Example 7 | Comparative Example 8 | Comparative Example 9 | Comparative Example 10 |
|---|---|---|---|---|---|---|
| Composition of non-graft copolymer (A) | MMA | 73 | 74 | 73 | 76 | 71 |
| | PMI | 4 | 4 | 14 | 4 | — |
| | AN | 3 | 7 | 3 | 5 | 7 |
| | SM | 20 | 15 | 10 | 15 | 22 |
| | α-methyl-styrene | 0 | 0 | 0 | 0 | 0 |
| Physical properties of non-graft copolymer (A) | Refractive index | 1.5217 | 1.5159 | 1.5204 | 1.5159 | 1.5144 |
| | Tg | 110.5 | 106.4 | 121.2 | 108.6 | 105.6 |
| | Mw | 120,746 | 101,874 | 83,247 | 64,770 | 96,929 |
| | PDI | 2.04 | 1.95 | 1.99 | 1.96 | 1.77 |
| | Content of residual PMI in recovery solution (% by weight) | 0.27 | 0.17 | 2.13 | 0.09 | 0 |
| Composition of thermoplastic resin composition | Non-grafted copolymer (A) | 65 | 65 | 65 | 75 | 75 |
| | Small-diameter graft copolymer (B) | 30 | 30 | 30 | 20 | 20 |
| | Large-diameter graft copolymer (C) | 5 | 5 | 5 | 5 | 5 |
| Physical properties of thermoplastic resin composition | colorability | 25.3 | 24.8 | 25.2 | 24.61 | 24.58 |
| | Heat deflection temperature | 89 | 86 | 96 | 92.8 | 86 |
| | Pencil hardness | 2H | 2H | H | 2H | 2H |
| | Impact strength | 6.4 | 5.8 | 5.3 | 3 | 6.2 |
| | Tensile strength | 476 | 467 | 472 | 528 | 552 |
| | Falling ball impact | 31.0 | 29.5 | 27.3 | 26.9 | 28.5 |

As shown in Tables 1 to 3, it can be confirmed that compared to Comparative Examples 1 to 10 outside the range of the present invention, Examples 1 to 5 according to the present invention exhibit excellent colorability, heat deflection temperature, and pencil hardness (scratch resistance) while maintaining impact strength, tensile strength, and fall impact strength.

In addition, the non-grafted copolymers (A) of Examples 1 to 5 according to the present invention exhibit low refractive index values, indicating that colorability is improved. In addition, when the non-grafted copolymer (A) is prepared, the conversion rate of N-phenyl maleimide may be improved. Thus, during long-term operation, precipitation of N-substituted maleimide in a pipe connected to a residual monomer recovery tank may be reduced in a volatilization process, thereby increasing productivity.

In addition, in the case of Comparative Example 9 including the non-grafted copolymer (A) in an amount outside the range of the present invention, impact strength and fall impact strength are reduced. In the case of Comparative Example 10 including the non-grafted copolymer (A) not including PMI in an amount outside the range of the present invention, heat deflection temperature is greatly reduced.

The invention claimed is:

1. A thermoplastic resin composition, comprising:
    55 to 70% by weight of a non-grafted copolymer (A) containing 65 to 83% by weight of a (meth)acrylic acid alkyl ester compound, 2 to 12% by weight of an N-substituted maleimide compound, 1 to 6% by weight of a vinyl cyanide compound, and 7 to 17% by weight of an aromatic vinyl compound;
    20 to 42% by weight of an acrylate-based rubber-aromatic vinyl compound-vinyl cyanide compound graft copolymer (B) containing acrylate-based rubber having an average particle diameter of 50 to 200 nm; and
    1 to 15% by weight of an acrylate-based rubber-aromatic vinyl compound-vinyl cyanide compound graft copolymer (C) containing acrylate-based rubber having an average particle diameter of 300 to 600 nm.

2. The thermoplastic resin composition according to claim 1, wherein the non-grafted copolymer (A) has a weight average molecular weight of 95,000 to 130,000 g/mol.

3. The thermoplastic resin composition according to claim 1, wherein the non-grafted copolymer (A) has a glass transition temperature of 107° C. or more.

4. The thermoplastic resin composition according to claim 1, wherein the non-grafted copolymer (A) has a refractive index of 1.520 or less.

5. The thermoplastic resin composition according to claim 1, wherein the graft copolymer (B) comprises 20 to 60% by weight of the acrylate-based rubber having an average particle diameter of 50 to 200 nm, 10 to 50% by weight of an aromatic vinyl compound, and 5 to 30% by weight of a vinyl cyanide compound.

6. The thermoplastic resin composition according to claim 1, wherein the graft copolymer (C) comprises 20 to 60% by weight of the acrylate-based rubber having an average particle diameter of 300 to 600 nm, 10 to 50% by weight of an aromatic vinyl compound, and 5 to 30% by weight of a vinyl cyanide compound.

7. The thermoplastic resin composition according to claim 1, wherein the thermoplastic resin composition has an L value (colorability) of 25.5 or less as measured using a Hunter Lab spectrophotometer.

8. The thermoplastic resin composition according to claim 1, wherein the thermoplastic resin composition has a pencil hardness of 2H or more as measured at an angle of 45° under a load of 0.5 kg using a pencil hardness tester (Cometech) according to ASTM D3363.

9. A method of preparing a thermoplastic resin composition, the method comprising kneading and extruding, under conditions of 200 to 270° C. and 200 to 300 rpm, 55 to 70% by weight of a non-grafted copolymer (A) containing 65 to 83% by weight of a (meth)acrylic acid alkyl ester compound, 2 to 12% by weight of an N-substituted maleimide compound, 1 to 6% by weight of a vinyl cyanide compound, and 7 to 17% by weight of an aromatic vinyl compound; 20 to 42% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm.

10. The method according to claim 9, comprising preparing the non-grafted copolymer (A) by polymerizing a polymerization solution prepared by mixing 100 parts by weight of a monomer mixture comprising 65 to 83% by weight of a (meth)acrylic acid alkyl ester compound, 2 to 12% by weight of an N-substituted maleimide compound, 1 to 6% by weight of a vinyl cyanide compound, and 7 to 17% by weight of an aromatic vinyl compound; 15 to 40 parts by weight of a reaction solvent; and 0.01 to 1 part by weight of an initiator.

11. The method according to claim 10, wherein, in the preparing of the non-grafted copolymer (A), polymerization is performed at a temperature of 130 to 160° C. while continuously feeding the polymerization solution at a rate of 7 to 20 kg/hr into a continuous reactor.

12. The method according to claim 10, wherein, in the preparing of the non-grafted copolymer (A), a residual content of the N-substituted maleimide compound in a recovery solution after polymerization is 0.12% by weight or less.

13. A molded article manufactured using the thermoplastic resin composition according to claim 1.

* * * * *